US012646929B2

(12) United States Patent
Michal

(10) Patent No.: US 12,646,929 B2
(45) Date of Patent: Jun. 2, 2026

(54) CURRENT MATCHING CIRCUITRY

(71) Applicant: STMicroelectronics International N.V., Geneva (CH)

(72) Inventor: Vratislav Michal, Fontanil-Cornillon (FR)

(73) Assignee: STMicroelectronics International N.V., Geneva (CH)

( * ) Notice: Subject to any disclaimer, the term of this patent is extended or adjusted under 35 U.S.C. 154(b) by 189 days.

(21) Appl. No.: 18/403,085

(22) Filed: Jan. 3, 2024

(65) Prior Publication Data

US 2025/0219397 A1       Jul. 3, 2025

(51) Int. Cl.
    *H02H 9/02*       (2006.01)
    *H01S 3/00*       (2006.01)
(52) U.S. Cl.
    CPC ........... *H02H 9/025* (2013.01); *H01S 3/0014* (2013.01)
(58) Field of Classification Search
    CPC   H02H 9/02; H02H 9/025; H02H 3/02; H02H 3/021; H02H 3/08; H01S 3/00; H01S 3/0014; G01R 31/327; H01H 89/00
    USPC ............................................... 361/93.7–93.9
    See application file for complete search history.

(56) References Cited

U.S. PATENT DOCUMENTS

| | | | |
|---|---|---|---|
| 8,841,897 B2 | 9/2014 | Williams et al. | |
| 9,793,798 B1 * | 10/2017 | de Cremoux | H02M 3/156 |
| 2014/0186046 A1 * | 7/2014 | Gao | H01S 3/0014 |
| | | | 372/38.03 |
| 2017/0102724 A1 | 4/2017 | Petenyi | |
| 2018/0301896 A1 | 10/2018 | Faingersh et al. | |
| 2019/0260376 A1 * | 8/2019 | Zuniga | H02M 3/156 |
| 2021/0288622 A1 | 9/2021 | Podzemny | |
| 2022/0021196 A1 * | 1/2022 | Santillan | H03K 17/0822 |
| 2022/0113751 A1 | 4/2022 | Hodgson et al. | |
| 2022/0286042 A1 * | 9/2022 | Hisada | H02M 1/0009 |

* cited by examiner

*Primary Examiner* — Danny Nguyen
(74) *Attorney, Agent, or Firm* — Slater Matsil, LLP

(57)       ABSTRACT

An over-current protection sensor circuit is disclosed. The circuit includes: a reference current source, configured to source a reference current; a reference MOS transistor, configured to receive the reference current and a gate voltage, and to generate a reference drain voltage based at least in part on the reference current and the gate voltage; an operational amplifier, configured to receive a reference voltage and to generate the gate voltage based on a difference between the reference voltage and the reference drain voltage; an output MOS transistor, configured to receive an input current and the gate voltage, and to generate an output drain voltage based at least in part on the input current and the gate voltage; and a comparator, configured to generate an over-current signal based on a difference between the reference drain voltage and the output drain voltage.

22 Claims, 6 Drawing Sheets

600

CURRENT MATCHING CIRCUITRY

TECHNICAL FIELD

The present disclosure generally relates to current matching circuits, as well as to methods for generating matched currents.

BACKGROUND

Some electronic systems benefit from matched currents. For example, current source integrated circuit are used to generate currents of known value or of known ratios with respect to a reference current. In addition, currents of a known value or of know ratios with respect to an input current may be used to determine whether the input current is greater than a threshold limit, for example, as part of an over-current detection circuit.

SUMMARY

One embodiment is an over-current protection sensor circuit including: a reference current source, configured to source a reference current; a reference MOS transistor, configured to receive the reference current and a gate voltage, and to generate a reference drain voltage based at least in part on the reference current and the gate voltage; an operational amplifier, configured to receive a reference voltage and to generate the gate voltage based on a difference between the reference voltage and the reference drain voltage; an output MOS transistor, configured to receive an input current and the gate voltage, and to generate an output drain voltage based at least in part on the input current and the gate voltage; and a comparator, configured to generate an over-current signal based on a difference between the reference drain voltage and the output drain voltage.

Another embodiment is an electrical system, including: a controller; a current sourcing circuit; and an over-current protection sensor circuit, including a reference current source, configured to source a reference current; a reference MOS transistor, configured to receive the reference current and a gate voltage, and to generate a reference drain voltage based at least in part on the reference current and the gate voltage; an operational amplifier, configured to receive a reference voltage and to generate the gate voltage based on a difference between the reference voltage and the reference drain voltage; an output MOS transistor, configured to receive an input current and the gate voltage, and to generate an output drain voltage based at least in part on the input current and the gate voltage; and a comparator, configured to generate an over-current signal based on a difference between the reference drain voltage and the output drain voltage.

Another embodiment is a method of operating an over-current protection sensor circuit, the method including: with a reference current source, sourcing a reference current; with a reference MOS transistor, receiving the reference current and a gate voltage, and generating a reference drain voltage based at least in part on the reference current and the gate voltage; with an operational amplifier, receiving a reference voltage and generating the gate voltage based on a difference between the reference voltage and the reference drain voltage; with an output MOS transistor, receiving an input current and the gate voltage, and generating an output drain voltage based at least in part on the input current and the gate voltage; and with a comparator, generating an over-current signal based on a difference between the reference drain voltage and the output drain voltage.

Another embodiment is an overcurrent condition sense circuit, including: a current source; a reference transistor configured to conduct current of the current source and to generate a reference transistor voltage based on the conducted current, the reference transistor including a reference gate; an output transistor configured to receive an input current, the output transistor including an output gate electrically connected to the reference gate, the output transistor configured to generate an output transistor voltage based on the input current, the output transistor voltage providing an indication of an amount of the input current; a difference amplifier circuit configured to generate an amplifier output signal based on a difference between the reference transistor voltage and the output transistor voltage; and a switching network configured to select the reference transistor from a plurality of candidate reference transistors.

BRIEF DESCRIPTION OF THE DRAWINGS

For a more complete understanding of one or more embodiments of the present disclosure, and the advantages thereof, reference is now made to the following descriptions taken in conjunction with the accompanying drawings, in which.

Figure 1:
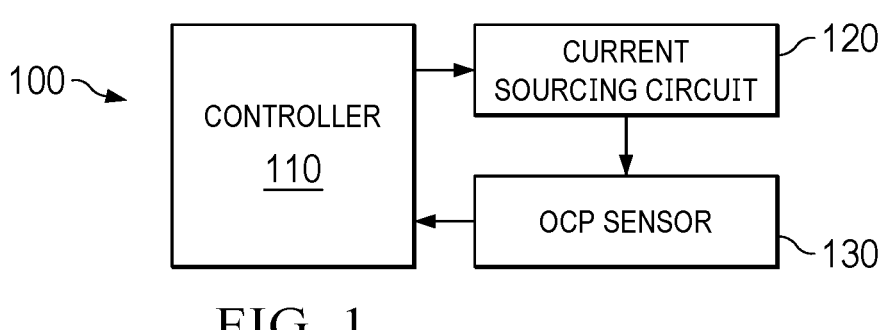
FIG. 1 shows a schematic circuit diagram of an electronic system according to some embodiments.

Corresponding numerals and symbols in the different figures generally refer to corresponding parts unless otherwise indicated. The figures are drawn to illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope. Unless specified otherwise, the expressions "about", "around", "approximately", and "substantially" signify or include within 10%, and preferably within 5% of the given value or, such as in the case of substantially zero, less than 10% and preferably less than 5% of a comparable quantity. Unless specified otherwise, the expressions "equal", "similar", "proportional", or other relational terms are understood to signify or include that the relation is substantially equal, substantially similar, substantially proportional, etc.

The embodiments discussed herein illustrate various aspects of current matching in the power integrated circuits, which use minimal die area to implement, and which provide accurate current matching techniques. In some embodiments, the techniques allow for improved current range coverage with single geometry. In some embodiments, a physical implementation may be shared among different implementations. In some embodiments, the techniques simplify trimming and one-time programming (OTP) requirements. In some embodiments, circuits using the techniques have improved metallization matching and transistor $R_{ON}$ matching improving the trimming accuracy over temperature. In some embodiments, the techniques reduce or remove errors caused by low comparator common mode voltage. In some embodiments, the techniques reduce or remove errors caused by comparator or amplifier offsets.

In some embodiments, the circuits allow operate properly over a wide range of currents. For example, in some embodiments, the effective width or size of MOS transistors does not change or it is not adjusted for different operational ranges of currents. This improves the accuracy and simplify trimming process for a large range of currents. In some embodiments, the matching is constant across wide range of currents.

In some embodiments, the techniques enable circuits operate over a wide current range with constant drain to source voltage ($V_{DS}$).

In some embodiments, the techniques allow for effective detection of over-current conditions in other circuit elements, such as lasers source or other current carrying circuits or circuit elements.

In some embodiments, the techniques mitigate mismatch discrepancy between similar current paths. For example, in some embodiments, the techniques mitigate mismatch between metallization paths, metallization path being understand as the metallic connection between pad and the transistor terminal, sometimes called layout resistance.

In some embodiments, the techniques allow for decreased testing and/or calibration time, for example, during industrial wafer test.

For a wide programmable current range, some embodiments use digital programming of the output transistor size (e.g., number of MOS transistor segments connected in parallel). In some embodiments, this is achieved by connecting/disconnecting the segment of the output transistor. In some embodiments, this prohibits trimming for a single operating point, because modifying MOS transistor size by digital control signal results in different matching for each setting, and thus an error which is dependent on output transistor size (or current range). This may, for example, be due to VDs spatial gradient mismatch across the device caused by imperfect metallization.

Conventionally, a large current range results in large variation of the area devices due to the wide programming range. In some case, it results in an excessive mismatch across the devices, large variation of VDs imposing high requirements on the comparator offset, difficulties in keeping accurate matching, and difficulties in providing single trimming for the whole current range (e.g., 100 mA to 5 A).

In some embodiments, the techniques described here regulate a Vds of the reference transistor by controlling the Vgs of the reference transistor. In some embodiments, the Vds is constant or substantially constant across the whole current range.

In some embodiments, the Ron of the reference and output MOS transistors are regulated so as to match or to have a desired ratio. Ron stands for the ON resistance of the MOS transistor in the ohmic ration. Note: By controlling the VDS, transistor can also operate in saturation, where ON resistance definition is invalid In some embodiments, a single trimming can be performed, where the trimming is effective or stable across the whole current range.

In some embodiments, for currents less than a threshold, the reference and output MOS transistors operate in weak inversion.

FIG. 1 shows a schematic circuit diagram of an electronic system 100 according to some embodiments. Electronic system 100 includes a controller 110, a current sourcing circuit 120, and an over current protection (OCP) sensor 130. Electronic system 100 is configured to perform a function based on the particular function of the current sourcing circuit 120, discussed below. In addition, Electronic system 100 is configured to cause the current sourcing circuit 120 to perform its function under the condition that the current received by OCP sensor 130 from the current sourcing circuit 120 is less than a threshold.

Current sourcing circuit 120 may include one or more elements which operate based on a conducted current. For example, current sourcing circuit 120 may include an LED or laser source configured to emit radiation in response to a conducted current. In some embodiments, the LED or laser source emits radiation in a visible wavelength, or an infrared bandwidth. In some embodiments, the current sourcing circuit 120 includes other circuit elements which produce a current that needs to be monitor by the over-current protection circuit.

Another type of the over-current protection can be an DC/DC converter powering a microprocessor. This allows to protect the circuit against overcurrent due to the failure of some electrical component of the circuit.

Controller 110 is configured to provide control signals to the current sourcing circuit 120 to cause the current sourcing circuit 120 to operate or to cease operating. For example, controller 110 may function according to stored instructions or according to circuit functionality which responds to various stimuli which cause the controller 110 to cause the current sourcing circuit 120 to operate or to cease operating.

For example, in embodiments where current sourcing circuit 120 includes a laser, controller 110 may receive inputs indicating conditions (load current value) which allows to decide whether laser is allowed to emit radiation or conditions under which the laser is to not allowed to emit radiation. In response to the input stimuli indicating that the laser is to function, controller 110 transmits control signals to the current sourcing circuit 120 using transmission path 112, where the control signals cause the laser to emit radiation. In response to the input stimuli indicating that the laser is to not function, controller 110 transmits control signals to the current sourcing circuit 120 using transmission path 112, where the control signals cause the laser to not emit radiation.

Similarly, in embodiments where current sourcing circuit 120 includes a different device, controller 110 may receive inputs indicating conditions under which the different device is to function or conditions under which the different circuit is to not function. In response to the input stimuli indicating that the different device is to function, controller 110 generates control signals for the current sourcing circuit 120 which causes the different device to function. In response to the input stimuli indicating that the different device is to not function, controller 110 generates control signals for the current sourcing circuit 120 which causes the different device to not function.

OCP sensor 130 is configured to receive a current input signal from current sourcing circuit 120 using conduction path 122, where the current input signal provides an indication of the current used by current sourcing circuit 120.

In some embodiments, the current input signal is a current used by current sourcing circuit 120 to perform the function of current sourcing circuit 120. For example, in embodiments where the current sourcing circuit 120 includes a laser source, e.g. VCSEL (vertical-cavity surface-emitting laser), the current input signal received by OCP sensor 130 from current sourcing circuit 120 may be the current flowing through the laser. Similarly, in embodiments where the current sourcing circuit 120 includes a different device, the current input signal received by OCP sensor 130 from current sourcing circuit 120 may be the current flowing through the different device causing the different device to function.

In some embodiments, the current input signal is a current generated based on or otherwise similar to, equal to, or proportional to the current used by current sourcing circuit 120 to perform the function of current sourcing circuit 120. For example, in embodiments where the current sourcing circuit 120 includes a laser, the current input signal received by OCP sensor 130 from current sourcing circuit 120 may be a current generated based on or otherwise similar to, equal to, or proportional to the current flowing through the laser. Similarly, in embodiments where the current sourcing circuit 120 includes a different device, the current input signal received by OCP sensor 130 from current sourcing circuit 120 may be a current generated based on or otherwise similar to, equal to, or proportional to current flowing through the different device causing the different device to function.

OCP sensor 130 is configured to receive the current input signal from current sourcing circuit 120, and to determine whether the current input signal indicates that a current used by current sourcing circuit 120 is greater than a threshold. In addition, in response to determining that the current input signal indicates that the current used by current sourcing circuit 120 is greater than the threshold, OCP sensor 130 is configured to generate an over-current signal at conductor 132 indicating whether the current used by current sourcing circuit 120 is greater than the threshold. OCP sensor 130 is also configured to provide the over-current signal to controller 110.

Controller 110 is configured to receive the over-current signal from OCP sensor 130. In addition, in response to the over-current signal indicating that the current used by current sourcing circuit 120 is greater than the threshold, controller 110 is configured to generate control signals for current sourcing circuit 120 which cause current sourcing circuit to cease functioning. For example, in embodiments where the current sourcing circuit 120 includes a laser, the control signals may cause current sourcing circuit 120 to cease providing current to the laser such that the laser ceases to emit radiation. Similarly, in embodiments where the current sourcing circuit 120 includes a different device, the control signals may cause current sourcing circuit 120 to cease providing current to the different device such that the different device ceases to function.

Similarly, in response to the over-current signal indicating that the current used by current sourcing circuit 120 is less than the threshold, controller 110 is configured to generate control signals for current sourcing circuit 120 which allow current sourcing circuit 120 to function if other conditions cause the current sourcing circuit 120 to function. For example, in embodiments where the current sourcing circuit 120 includes a laser, the control signals may cause current sourcing circuit 120 to allow other signals to cause current sourcing circuit 120 to provide current to the laser such that the laser emits radiation. Similarly, in embodiments where the current sourcing circuit 120 includes a different device, the control signals may cause current sourcing circuit 120 to allow other signals to cause current sourcing circuit 120 to provide current to the different device such that the different device functions.

Figure 2:
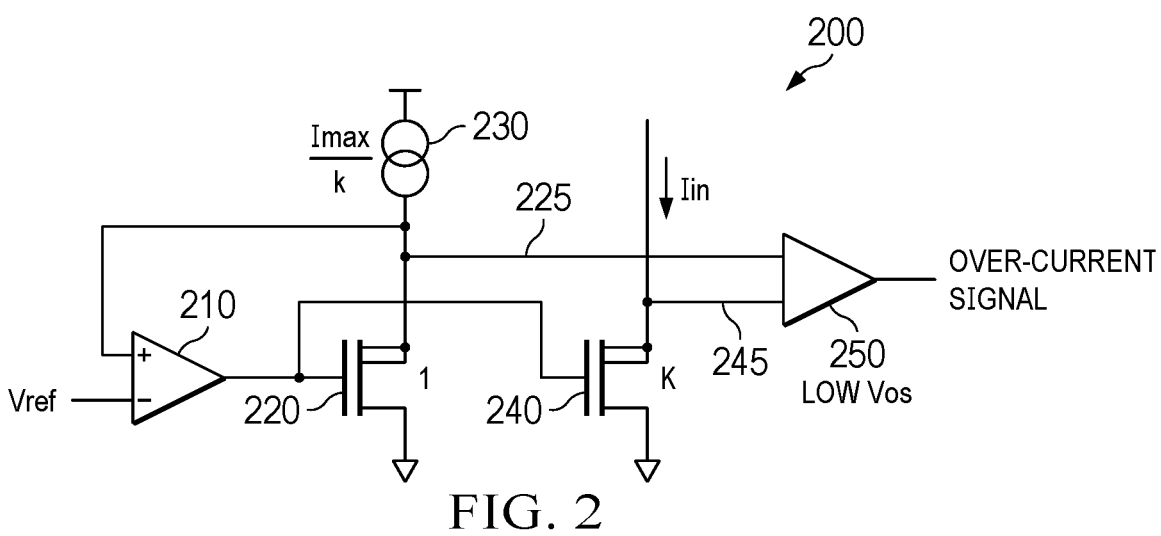
FIG. 2 shows a block diagram of an over-current detection circuit according to some embodiments.

FIG. 2 shows a block diagram of an OCP sensor 200 according to some embodiments. OCP sensor 200 is configured to receive a reference current Imax/k, and an output current from the load Iin, and to generate an over-current signal in response to the current input signal. OCP sensor 200 may be used as OCP sensor 130 of electronic system 100. OCP sensor 200 may be used in other electronic systems, and electronic system 100 may use OCP sensor circuits other than OCP sensor 200.

OCP sensor 200 includes opamp 210, reference MOS transistor 220, current source 230, output MOS transistor 240, and comparator 250.

Opamp 210 may be any type of operational amplifier. For example, opamp 210 may include a differential input stage, and may include one or more additional gain stages. Accordingly, opamp 210 is configured to receive a differential voltage input signal across its positive (+) and negative (−) input signals and to produce a voltage output which is the differential voltage input signal multiplied by a gain factor.

In the illustrated embodiment, opamp 210 is configured to receive a reference voltage (e.g. 30 mV-1 V), and to amplify the difference between the reference voltage and the voltage at the node 225 connected to the drain of reference MOS transistor 220 as an opamp output voltage.

Reference MOS transistor 220 is configured to be controlled by the opamp output voltage at its gate. In addition, reference MOS transistor 220 is configured to have a conductivity which is controlled by the received opamp output voltage. In the illustrated embodiment, the reference MOS transistor 220 is configured to have an increased conductivity in response to an increased opamp output voltage, and is configured to have a decreased conductivity in response to a decreased opamp output voltage.

Reference MOS transistor 220 is configured to receive a reference current from node 225, where the reference current is provided to node 225 by current source 230. As the reference current is fixed, the voltage at node 225 is a representation of the conductivity of reference MOS transistor 220. In addition, because of the negative feedback loop including opamp 210 and reference MOS transistor 220, the gate voltage of reference MOS 220 is that gate voltage which causes the conductivity of reference MOS transistor 220 to, combined with the reference current, force the voltage at node 225 to be substantially equal to the reference voltage Vref. Said otherwise, the operational amplifier adjusts the conductivity of the reference MOS transistor 220 in a manner that its drain voltage is close (equal) to Vref.

The current of reference current generator 230 is set to the threshold current (Ithreshold) divided by a constant k. Accordingly the voltage at node 225 is equal to R220× Ithreshold/k, where R220 is equal to the on resistance of reference MOS transistor 220.

The opamp output voltage is also applied to the gate of output power MOS transistor 240. Accordingly, the conductivity of output MOS transistor is proportional to the opamp output voltage, and is an image of the conductivity of the reference MOS transistor 220. In the illustrated embodiment, the output MOS transistor 240 is configured to have an increased conductivity in response to an increased opamp output voltage, and is configured to have a decreased conductivity in response to a decreased opamp output voltage. Ideally, the conductivity of device 240 is supposed to be k-times higher than the conductivity of the reference device 220, for identical gate-source voltage and comparable drain-to-source voltage.

Output MOS transistor 240 is configured to receive the current input signal Iin at the input node 245. As a result, the voltage at node 245 is equal to Iin×R240, where Iin is the input current and R240 is the equivalent large signal on resistance of the output MOS transistor 240.

Comparator 250 is configured to generate the over-current signal, where the over-current signal indicates whether the current input signal Iin is greater than the threshold Imax/k as determined by whether the voltage at node 245 is greater than the voltage at node 225. Accordingly, if the comparator 250 determines that the voltage at node 245 is greater than the voltage at node 225, the over-current signal indicates that the current input signal is greater than the maximum threshold. Similarly, if the comparator 250 determines that the voltage at node 245 is less than the voltage at node 225, the over-current signal indicates that the current input signal is less than the maximum threshold. In some embodiments, comparator 250 has a low input offset voltage configuration.

At the threshold condition of comparator 250 (where the voltage at node 225 equals the voltage at node 245), the Vgs and Vds of reference MOS transistor 220 are equal to the Vgs and Vds of output MOS transistor 240. In addition, as indicated in the figure, the effective width of the output MOS transistor 240 is k times the effective width of the reference MOS transistor 220. Therefore, at the threshold condition, the on-resistance of the reference MOS transistor 220 (R220) is k times the on resistance of the output MOS transistor 240 (R240), or R220=k×R240.

Accordingly, at the threshold condition, the voltage at node 245 equals the voltage at node 225, R240×Iin=R220× Imax/k, R220/k×Iin=R220×Imax/k, and Iin=Imax. Therefore, if the current input signal, Iin, is greater than the threshold current, Imax, comparator 250 determines that the voltage at node 245 is greater than the voltage at node 225, and comparator 250 generates an over-current signal indicating that the current input signal is greater than the maximum threshold. Similarly, if the current input signal, Iin, is less than the threshold current, Imax, comparator 250 determines that the voltage at node 245 is less than the voltage at node 225, and comparator 250 generates an over-current signal indicating that the current input signal is less than the maximum threshold.

An advantage listed already above is that the operational amplifier 210 maintain the reference threshold for the comparator constant, equal to Vref. This allows $1^{st}$ to operate with the constant structure of the reference and output power MOS pair, allowing apply single trimming procedure for entire current range, and $2^{nd}$ fix the common mode voltage to Vref, what is beneficial for the accuracy, as it allows to lower the offset contribution of the comparator.

Figure 3:
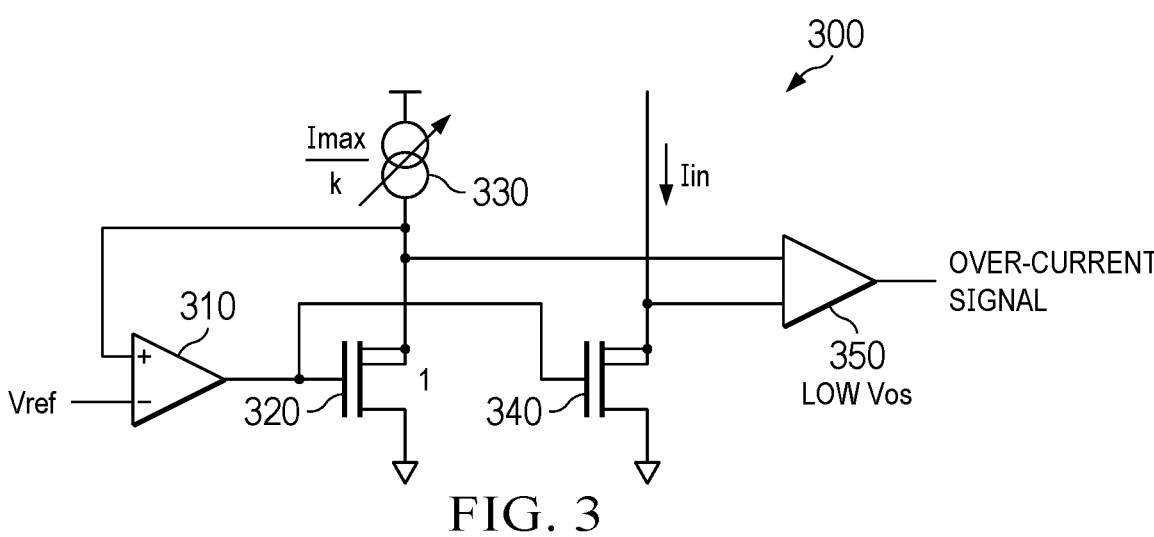
FIG. 3 shows a block diagram of an over-current detection circuit according to some embodiments.

FIG. 3 shows a block diagram of OCP sensor 300 according to some embodiments. OCP sensor 300 may have features, functionality, and usage which are similar or identical to that of OCP sensor 200. For example, each of the elements of OCP sensor 300 may have similar or identical functionality as the corresponding elements of OCP sensor 200.

In addition, in OCP sensor 300, the factor k is variable or programmable. As a result of programming the factor k, the current provided to reference MOS transistor 320 changes, and the effective width of output MOS transistor 340 changes. In some embodiments, programmability of the factor k is advantageous, for example, if the maximum allowable input current, Iin, changes. The programmability allows for the factor k to be changed so that the reference MOS transistor 320 and the output MOS transistor 340 can be operated with voltages which cause the reference MOS transistor 320 and the output MOS transistor 340 to operate in desired conductivity modes, such as a weak inversion mode, a linear region mode, a saturation mode, etc.

In some embodiments, optimum results of the circuits from FIGS. 2 and 3 may be obtained when the respective metallization resistance is reduced, for example, to be negligible compared to the respective resistance of the reference or power MOS transistor.

Layout Mismatch Mitigation

In embodiments of current matching MOS transistors, such as the reference and output MOS transistors discussed herein, device and metallization matching are important, for example, so that the Isource ratio of the current of the Imax/k current source to the maximum current of the current input signal (k) is the same as the MOS transistor ratio of the effective Ron of the output MOS transistor to the effective Ron of the reference MOS transistor, which is designed to also be equal to k.

In some embodiments, proper matching of the Isource and reference current can be achieved by adjusting the current of the reference current source, e.g. by a trimming process. Due to the different thermal characteristics of the metallization and of the transistors, the accuracy for the temperature different from the trimming temperature can be compromised. This is namely important for the implementation with high VDS spatial gradient, i.e. for implementation, where VDS is changing while considering different position on the power transistor matrix. As for example, the VDS is typically increasing when distance from the pad is increasing. This make proper placement of the reference device inside the power-MOS matrix difficult.

The effective Ron of the reference MOS transistor and the output MOS transistor includes the resistance of interconnect metallization. In some embodiments, mismatch of interconnect metallization is difficult to design for, and may be affected by temperature.

The effect on matching of temperature can be expressed as a proportional to a ratio of (RTcMet(ref)+RTcSW(ref)) and (RTcMet(out)+RTcSW(out)), where RTcMet(ref) is the temperature coefficient of the resistance of the metal of the reference MOS transistor, where RTcSW(ref) is the temperature coefficient of the on-resistance of the reference MOS transistor, where RTcMet(out) is the temperature coefficient of the resistance of the metal of the output MOS transistor, and wherein RTcSW(out) is the temperature coefficient of the on-resistance of the output MOS transistor. In some embodiments, achieving a desired matching of the Isource ratio and the MOS transistor ratio can be achieved by use of a programmable array of redundant reference MOS transistors. This signify, that the reference transistors placement can be chosen by programming in the application, which includes final chip package and PCB. This selection is to be based e.g. on a search algorithm, that, in a given way, select the best location of the reference devices across the matrix. The cost function of this algorithm is the matching of the output and reference currents across operational temperature range.

For example, during a testing and/or calibration procedure, each of the redundant reference MOS transistors may be individually connected to the circuit by controlling a selection multiplexer, or can be connected and a variable amount of the reference devices to improve matching over the power MOS array. In addition, a relative matching score for each spatial configuration of the reference devices MOS transistors may be determined, where the relative matching score indicates a relative matching of the Isource ratio and the MOS transistor ratio for each of the redundant reference MOS transistors. During such a testing and/or calibration procedure, one or more of the redundant reference MOS transistors that have the best relative matching score may be identified, and the corresponding input for the selection multiplexer may be stored in a memory. Subsequently, during normal operation, the stored selection multiplexer input may be used to select the identified redundant reference MOS transistor for use. An advantage of this approach is that the optimal placement of the sense reference devices can be determined only once, and can be the applied to all chips for the production without calibration.

Another advantage is that determining score of each spatial distribution of the sense device take in to account the layout (including drain, source and substrate resistance), and also the PCB parasitic resistance. This is sometimes difficult or impossible to determine during the design phase of the power stage (integrated circuit)

In some embodiments, one or more dies of a wafer are tested, and the selected selection multiplexer input may be stored and used by a number of other dies on the wafer, where, in some embodiments, the other dies are not tested to determine a selection multiplexer input. Accordingly, for a particular one or more dies of a wafer, one or more MOS transistors may be identified in a testing and/or calibration procedure, and the results of the testing and/or calibration procedure may be applied to all of the other dies of the wafer. As a result, each of the dies of the wafer may have a particular redundant reference MOS transistor selected, where the selected redundant reference MOS transistor of the dies are schematically the same redundant reference MOS transistor.

In some embodiments, the selected selection multiplexer input may be stored and used by a number of other dies on other wafers, where, in some embodiments, the other wafers are not tested to determine a selection multiplexer input. For example, a representative die is tested and an appropriate or best matching reference MOS transistor is identified for that die. The same reference MOS transistor may also be selected for adjacent dies or for all dies on the wafer in some embodiments. In certain embodiments, the identified location of the reference MOS transistor on the die may be also used to identify corresponding reference MOS transistors in wafers processed at the same time, for example.

Figure 4:
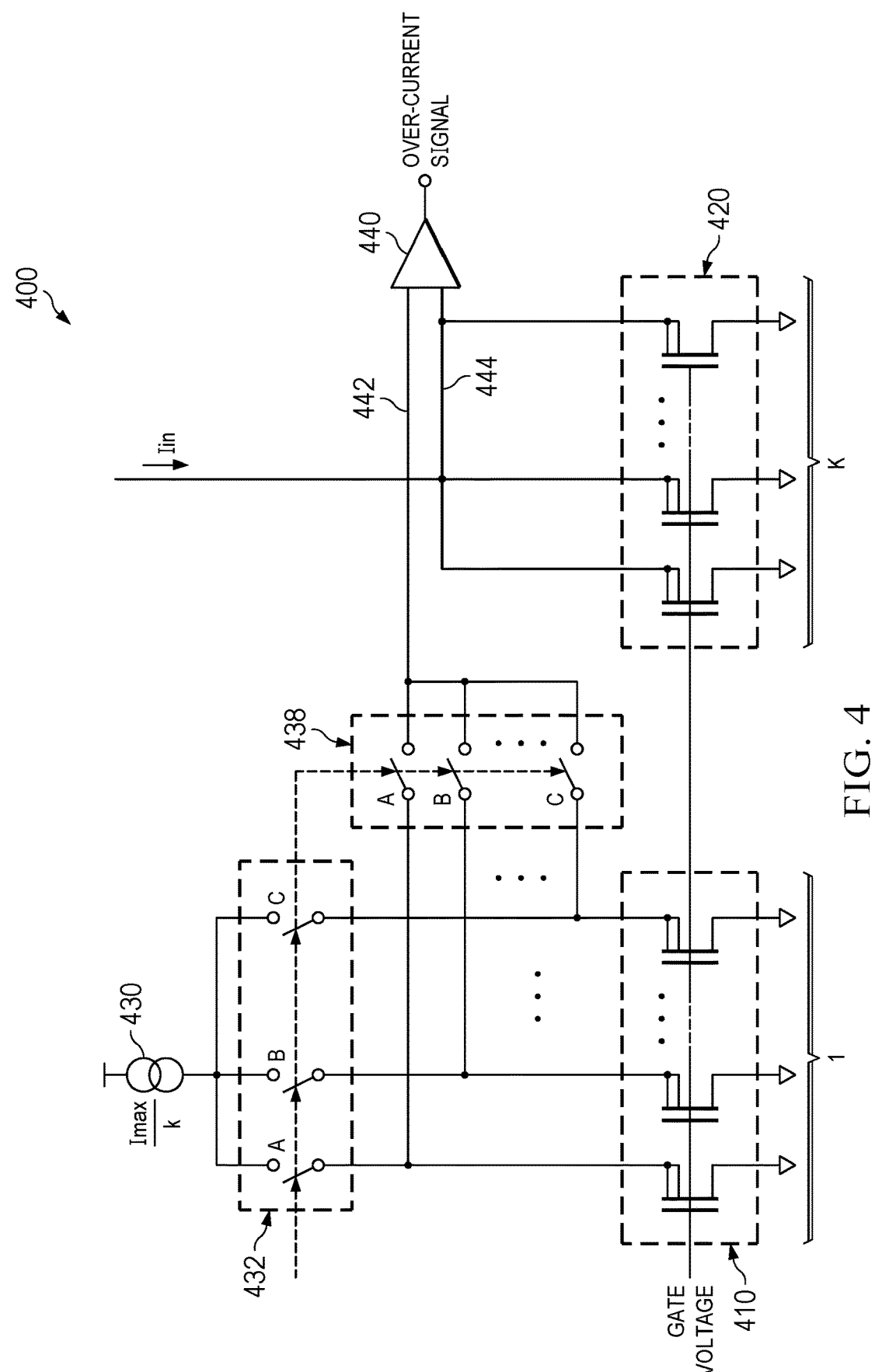
FIG. 4 shows a block diagram of an over-current detection circuit according to some embodiments.

FIG. 4 shows a block diagram of an OCP sensor 400 according to some embodiments. OCP sensor 400 includes reference MOS transistor 410, output MOS transistor 420, current source 430, comparator 440, and switching networks 432 and 434. Compared to the embodiments of FIG. 2 and FIG. 3, this embodiment does not operate with constant VDS, but the threshold VDS depends on the reference current.

Switching network 432 electrically connects the current source 430 to one of the redundant reference MOS transistors 410 in response to a selection multiplexer input. In addition, switching network 434 connects the comparator 440, at node 442, to the same one of the redundant reference MOS transistors 410 in response to the selection multiplexer input. Therefore, the comparator compares the voltage at node 444 to the voltage at node 442, where the voltage at node 442 corresponds with the reference current from current source 430 times the total resistance of the selected redundant reference MOS transistor 410 and any other sources of resistance caused voltage drop, such as the metallization carrying current to the selected redundant reference MOS transistor 410.

Comparator 440 generates an over-current signal based on which of the nodes 442 and 444 have a higher voltage. If the voltage at node 444 is greater than the voltage at node 442, the over-current signal indicates that the current input signal (Iin) is greater than a threshold. If the voltage at node 444 is less than the voltage at node 442, the over-current signal indicates that the current input signal (Iin) is less than the threshold.

The voltage at node 444 is equal to the input current Iin times the resistance of the output MOS transistor network, including the metallization. In addition, the voltage at node 442 is equal to the current of current source 430 times the resistance of the reference MOS transistor selected by switching networks 432 and 434 and the associated metallization.

During a testing and/or calibration procedure, the selected (e.g., optimal) selection multiplexer input is determined and stored, for example, as discussed above. As a result, because the stored selection multiplexer input is used, during operation, the Isource ratio and the MOS transistor ratio of OCP sensor 400 have effective matching.

Figure 5:
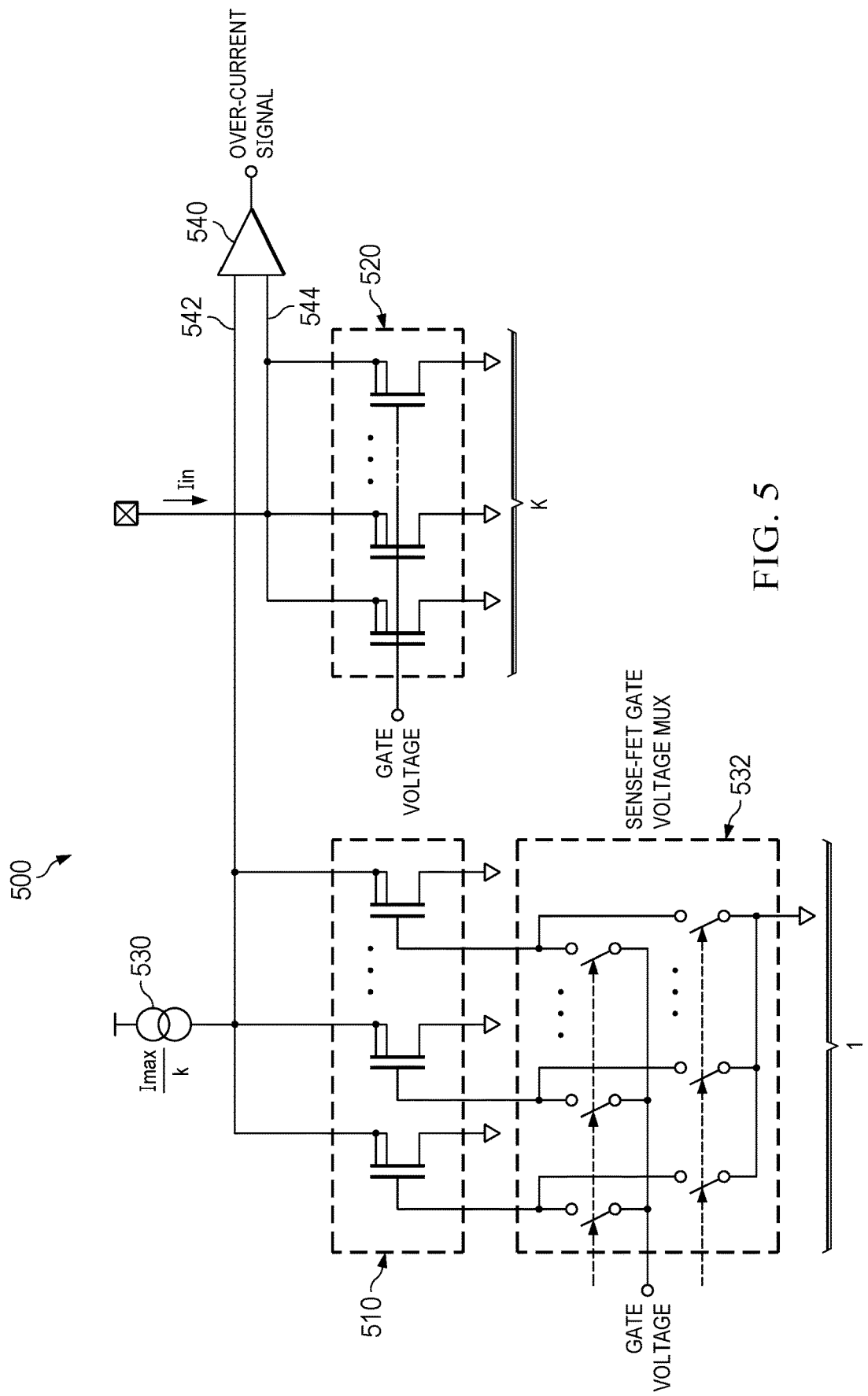
FIG. 5 shows a block diagram of an over-current detection circuit according to some embodiments.

FIG. 5 shows a block diagram of an OCP sensor 500 according to some embodiments. OCP sensor 500 includes reference MOS transistor 510, output MOS transistor 520, current source 530, comparator 540, and switching network 532. A difference between FIG. 5 and FIG. 4 is that the reference devices are connected by multiplexing the reference current and the drain terminal (FIG. 4), while FIG. 5, multiplexing of gate signal is provided. One or other solution advantage is the more efficient layout implementation.

Switching network 532 electrically connects the gate of each of the redundant reference MOS transistors 510 to either a bias voltage (e.g., 2.5v or another voltage) or the ground voltage in response to a selection multiplexer input.

Comparator 540 generates an over-current signal based on which of nodes 542 and 544 have a higher voltage. If the voltage at node 544 is greater than the voltage at node 542, the over-current signal indicates that the current input signal (Iin) is greater than a threshold. If the voltage at node 544 is less than the voltage at node 542, the over-current signal indicates that the current input signal (Iin) is less than the threshold.

The voltage at node 544 is equal to the input current Iin times the resistance of the output MOS transistor network, including the metallization. In addition, the voltage at node 542 is equal to the current of current source 530 times the resistance of the reference MOS transistor having its gate connected to the bias voltage by switching network 532.

During a testing and/or calibration procedure, the selection multiplexer input is determined and stored, for example, as discussed above. As a result, because the stored selection multiplexer input is used, during operation, the Isource ratio and the MOS transistor ratio of OCP sensor 500 have effective matching.

Figure 6:
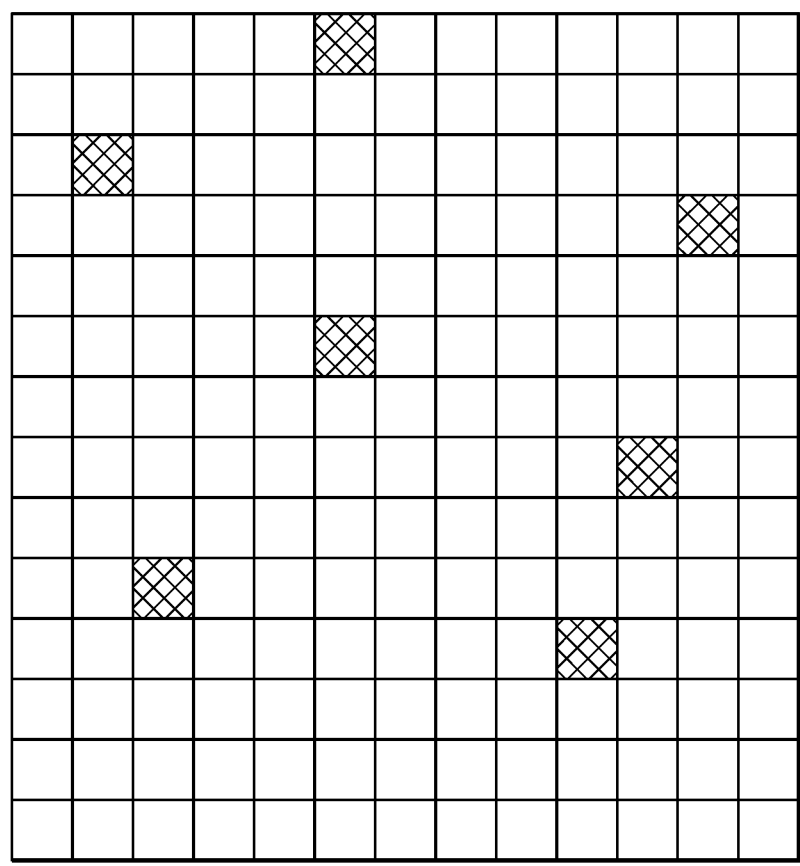
FIG. 6 shows a schematic layout arrangement of a reference MOS transistor and an output MOS transistor according to some embodiments.

FIG. 6 shows a schematic layout arrangement 600 of a set of redundant reference MOS transistors and output MOS transistor segments according to some embodiments. Here, the post-fabrication spatial customisation of the sense devices is implicit. In the illustrated embodiment, an array of MOS transistors or MOS transistor segments is shown. The array includes segments of the output MOS transistor 620, which may be schematically connected, for example, as illustrated in either of FIGS. 4 and 5. The array also includes redundant reference MOS transistors 610, which may be schematically connected, for example, as illustrated in either of FIGS. 4 and 5.

The redundant reference MOS transistors 610 may be distributed among the segments of the output MOS transistor 620 to improve the likelihood that one, or, in some embodiments, a group of the redundant reference MOS transistors 610 and their mentalisations matches the output MOS transistor and its metallisation 620.

In some embodiments, unused redundant reference MOS transistors 610 are connected so as to be used as additional segments of the output MOS transistor 620.

Figure 7:
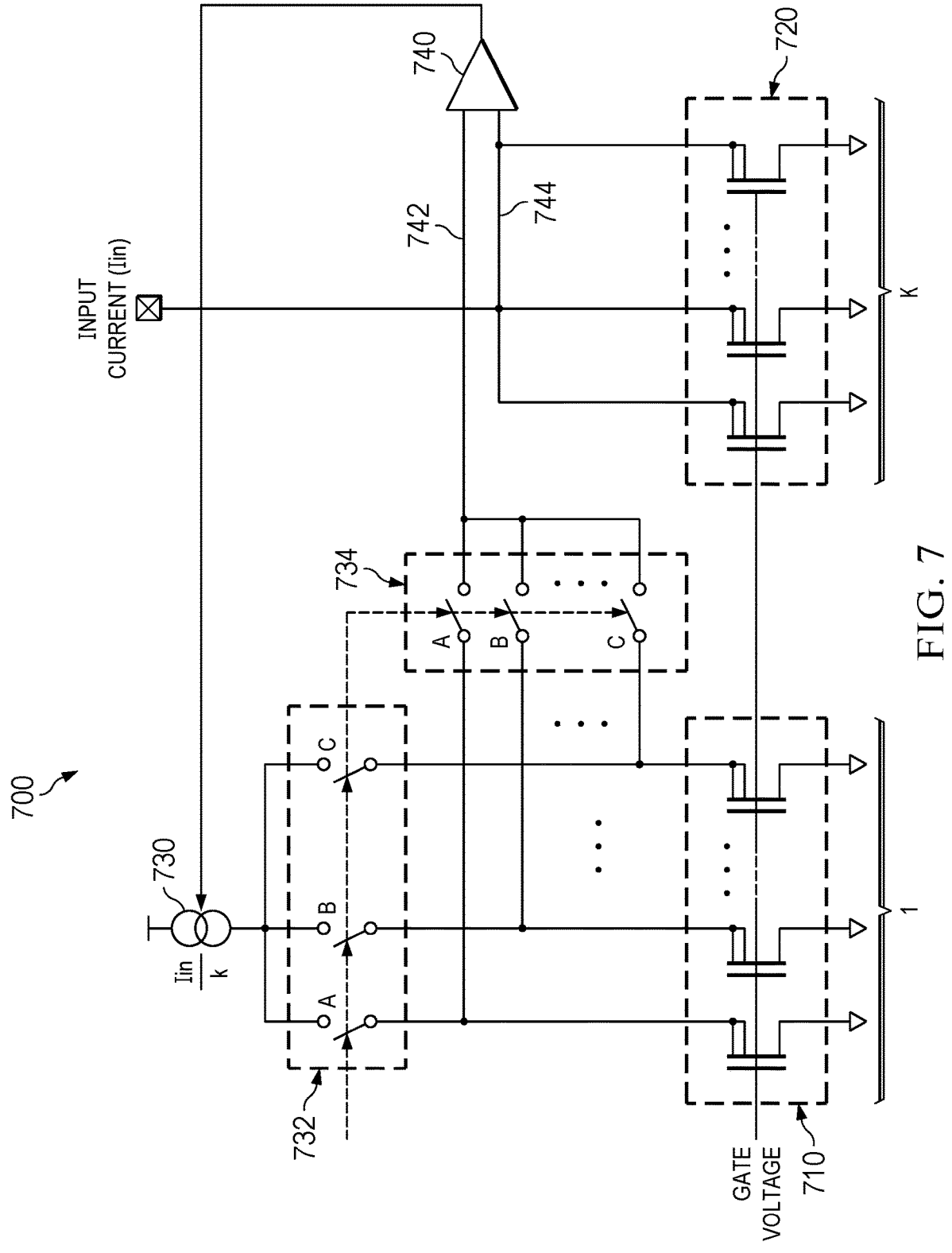
FIG. 7 shows a schematic circuit diagram of a current replica circuit according to some embodiments.

FIG. 7 shows a block diagram of a current structure 700 according to some embodiments. That allows to replicate the high output current to a much smaller value Iin/k. This current information can be used by other circuit, such as the DC/DC convertor current regulation loop. Compared to the over-current protection, which is measuring the load current value, current replicating circuit from FIG. 7 can be understand as a current generator. Similarly, as in both previous examples of the OCP, current replica accuracy FIG. 7 and FIG. 8 can be improved by use programmable sense reference transistor array. Current replica structure 700 includes reference MOS transistor 710, output MOS transistor 720, current source 730, opamp 740, and switching networks 732 and 734.

Switching network 732 electrically connects the current source 730 to one of the redundant reference MOS transistors 710 in response to a selection multiplexer input. In addition, switching network 734 connects the opamp 740, at node 742, to the same one of the redundant reference MOS transistors 710 in response to the selection multiplexer input.

Opamp 740 generates a feedback signal based on a difference of the voltages at nodes 742 and 744. The feedback signal is provided to current source 730, which generates a current for the reference MOS transistor 710 based on the feedback signal. The negative feedback of the loop minimizes the difference between the voltages at nodes 742 and 744.

The voltage at node 744 is equal to the input current Iin times the resistance of the output MOS transistor network, including the metallization. In addition, the voltage at node 742 is equal to the current of current source 730 times the resistance of the reference MOS transistor selected by switching networks 732 and 734 and the associated metallization.

During a testing and/or calibration procedure, the selection multiplexer input is determined and stored, for example, as discussed above. As a result, because the stored selection multiplexer input is used, during operation, the Isource ratio and the MOS transistor ratio of OCP sensor 700 have effective matching. Consequently, the current from current source 730 matches the input current Iin divided by k.

Figure 8:
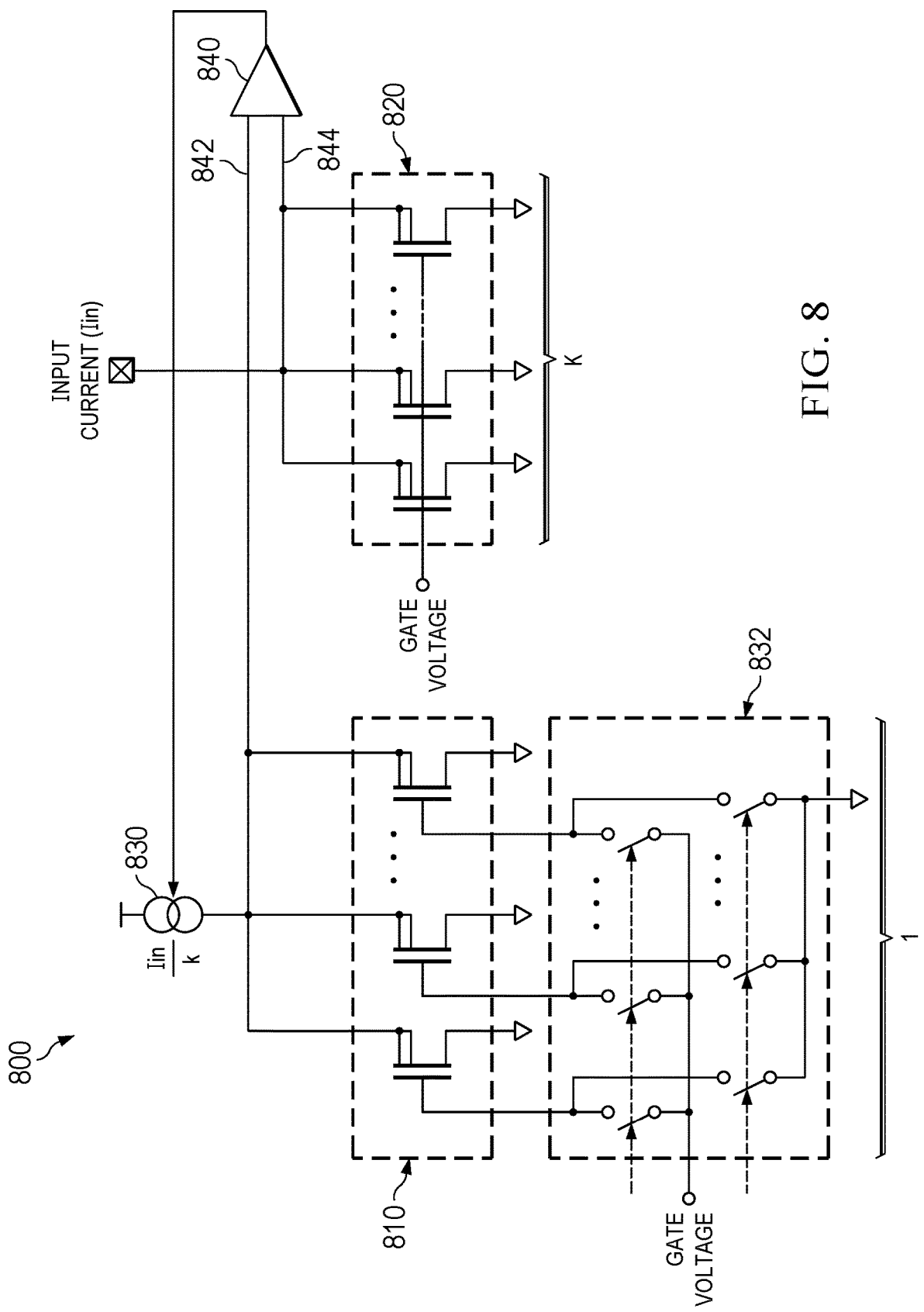
FIG. 8 shows a schematic circuit diagram of a current replica circuit according to some embodiments.

FIG. 8 shows a block diagram of a current replica structure 800 according to some embodiments. Replica structure 800 includes reference MOS transistor 810, output MOS transistor 820, current source 830, opamp 840, and switching network 832.

Opamp 840 generates a feedback signal based on a difference of the voltages at nodes 842 and 844. The feedback signal is provided to current source 830, which generates a current for the reference MOS transistor 810 based on the feedback signal. The negative feedback of the loop minimizes the difference between the voltages at nodes 842 and 844.

The voltage at node 844 is equal to the input current Iin times the resistance of the output MOS transistor network, including the metallization. In addition, the voltage at node 842 is equal to the current of current source 830 times the resistance of the reference MOS transistor selected by switching networks 832 and 834 and the associated metallization.

During a testing and/or calibration procedure, the selection multiplexer input is determined and stored, for example, as discussed above. As a result, because the stored selection multiplexer input is used, during operation, the Isource ratio and the MOS transistor ratio of OCP sensor 800 have effective matching. Consequently, the current from current source 830 matches the input current Iin divided by k.

Examples of the present invention are summarized here. Other examples can also be understood from the entirety of the specification and the claims filed herein.

Example 1. One embodiment is an over-current protection sensor circuit including: a reference current source, configured to source a reference current; a reference MOS transistor, configured to receive the reference current and a gate voltage, and to generate a reference drain voltage based at least in part on the reference current and the gate voltage; an operational amplifier, configured to receive a reference voltage and to generate the gate voltage based on a difference between the reference voltage and the reference drain voltage; an output MOS transistor, configured to receive an input current and the gate voltage, and to generate an output drain voltage based at least in part on the input current and the gate voltage; and a comparator, configured to generate an over-current signal based on a difference between the reference drain voltage and the output drain voltage.

Example 2. The over-current protection sensor circuit of example 1, where the over-current signal provides an indication of whether the input current is greater than a threshold current.

Example 3. The over-current protection sensor circuit of example 1, where an effective width of the output MOS transistor is a factor k times greater than an effective width of the reference current.

Example 4. The over-current protection sensor circuit of example 3, where the factor k is programmable.

Example 5. The over-current protection sensor circuit of example 3, where the over-current signal provides an indication of whether the input current is greater than a threshold current, and where the threshold current is the factor k greater than the reference current.

Example 6. The over-current protection sensor circuit of example 5, where the factor k is programmable.

Example 7. The over-current protection sensor circuit of example 1, where the reference MOS transistor includes a selected one of a plurality of redundant reference MOS transistors.

Example 8. The over-current protection sensor circuit of example 1, where in response to the input current being equal to the threshold current, a Vds drain to source voltage of the reference MOS transistor is equal to the a Vds drain to source voltage of the output MOS transistor.

Example 9. Another embodiment is an electrical system, including: a controller; a current sourcing circuit; and an over-current protection sensor circuit, including a reference current source, configured to source a reference current; a reference MOS transistor, configured to receive the reference current and a gate voltage, and to generate a reference drain voltage based at least in part on the reference current and the gate voltage; an operational amplifier, configured to receive a reference voltage and to generate the gate voltage based on a difference between the reference voltage and the reference drain voltage; an output MOS transistor, configured to receive an input current and the gate voltage, and to generate an output drain voltage based at least in part on the input current and the gate voltage; and a comparator, configured to generate an over-current signal based on a difference between the reference drain voltage and the output drain voltage.

Example 10. The electrical system of example 9, where the current sourcing circuit includes a laser.

Example 11. The electrical system of example 9, where the over-current signal provides an indication of whether the input current to the over-current protection sensor is greater than a threshold current.

Example 12. The electrical system of example 11, where the controller is configured to receive the over-current signal, and, in response to the over-current signal indicating that the input current to the over-current protection sensor is greater than a current threshold, generating a control signal which causes the current sourcing circuit to cease operating.

Example 13. The electrical system of example 9, where an effective width of the output MOS transistor is a factor k times greater than an effective width of the reference current.

Example 14. The electrical system of example 13, where the factor k is programmable.

Example 15. The electrical system of example 13, where the over-current signal provides an indication of whether the input current is greater than a threshold current, where the threshold current is the factor k greater than the reference current.

Example 16. The electrical system of example 15, where the factor k is programmable.

Example 17. The electrical system circuit of example 9, where the reference MOS transistor includes a selected one of a plurality of redundant reference MOS transistors.

Example 18. The electrical system of example 9, where in response to the input current being equal to the threshold current, a Vds drain to source voltage of the reference MOS transistor is substantially equal to the a Vds drain to source voltage of the output MOS transistor.

Example 19. Another embodiment is a method of operating an over-current protection sensor circuit, the method including: with a reference current source, sourcing a reference current; with a reference MOS transistor, receiving the reference current and a gate voltage, and generating a reference drain voltage based at least in part on the reference current and the gate voltage; with an operational amplifier, receiving a reference voltage and generating the gate voltage based on a difference between the reference voltage and the reference drain voltage; with an output MOS transistor, receiving an input current and the gate voltage, and generating an output drain voltage based at least in part on the input current and the gate voltage; and with a comparator, generating an over-current signal based on a difference between the reference drain voltage and the output drain voltage.

Example 20. The method of example 18, where the over-current signal provides an indication of whether the input current is greater than a threshold current.

Example 21. The over-current protection sensor circuit of example 19, where an effective width of the output MOS transistor is a factor k times greater than an effective width of the reference current, where the threshold current is the factor k greater than the reference current.

Example 22. Another embodiment is an overcurrent condition sense circuit, including: a current source; a reference transistor configured to conduct current of the current source and to generate a reference transistor voltage based on the conducted current, the reference transistor including a reference gate; an output transistor configured to receive an input current, the output transistor including an output gate electrically connected to the reference gate, the output transistor configured to generate an output transistor voltage based on the input current, the output transistor voltage providing an indication of an amount of the input current; a difference amplifier circuit configured to generate an amplifier output signal based on a difference between the reference transistor voltage and the output transistor voltage; and a switching network configured to select the reference transistor from a plurality of candidate reference transistors.

While this invention has been described with reference to illustrative implementations, this description is not intended to be construed in a limiting sense. Various modifications and combinations of the illustrative implementations, as well as other implementations of the invention, will be apparent to persons skilled in the art upon reference to the description. It is therefore intended that the appended claims encompass any such modifications or implementations.

What is claimed is:

1. An over-current protection sensor circuit, comprising:
a reference current source configured to source a reference current;
a reference MOS transistor configured to:
receive the reference current and a gate voltage, and
generate a reference drain voltage based on the reference current and the gate voltage;
an operational amplifier configured to:
receive a reference voltage, and generate the gate voltage based on a difference between the reference voltage and the reference drain voltage;

an output MOS transistor having an effective width that is a factor k times an effective width of the reference MOS transistor, the output MOS transistor configured to:

receive an input current and the gate voltage, and generate an output drain voltage based on the input current and the gate voltage; and a comparator configured to generate an over-current signal based on a difference between the reference drain voltage and the output drain voltage.

2. The over-current protection sensor circuit of claim 1, wherein the over-current signal indicates whether the input current is greater than a threshold current.

3. The over-current protection sensor circuit of claim 1, wherein the factor k is programmable.

4. The over-current protection sensor circuit of claim 1, wherein the over-current signal indicates whether the input current is greater than a threshold current, and wherein the threshold current is k times the reference current.

5. The over-current protection sensor circuit of claim 4, wherein the factor k is programmable.

6. The over-current protection sensor circuit of claim 1, wherein the reference MOS transistor comprises a selected one of a plurality of redundant reference MOS transistors.

7. The over-current protection sensor circuit of claim 1, wherein the over-current signal indicates whether the input current is greater than a threshold current, and wherein, in response to the input current being equal to the threshold current, a drain to source voltage of the reference MOS transistor is equal to a drain to source voltage of the output MOS transistor.

8. An electrical system, comprising:

a controller;

a current sourcing circuit; and an over-current protection sensor circuit, comprising:

a reference current source configured to source a reference current;

a reference MOS transistor configured to:

receive the reference current and a gate voltage, and generate a reference drain voltage based on the reference current and the gate voltage;

an operational amplifier configured to:

receive a reference voltage, and generate the gate voltage based on a difference between the reference voltage and the reference drain voltage;

an output MOS transistor having an effective width that is a factor k times an effective width of the reference MOS transistor, the output MOS transistor configured to:

receive an input current and the gate voltage, and generate an output drain voltage based on the input current and the gate voltage; and a comparator configured to generate an over-current signal based on a difference between the reference drain voltage and the output drain voltage.

9. The electrical system of claim 8, wherein the current sourcing circuit comprises a laser.

10. The electrical system of claim 8, wherein the over-current signal indicates whether the input current to the over-current protection sensor circuit is greater than a threshold current.

11. The electrical system of claim 10, wherein the controller is configured to:

receive the over-current signal, and generate a control signal that causes the current sourcing circuit to cease operation in response to the over-current signal indicating that the input current to the over-current protection sensor circuit is greater than the current threshold.

12. The electrical system of claim 8, wherein the factor k is programmable.

13. The electrical system of claim 8, wherein the over-current signal indicates whether the input current is greater than a threshold current, wherein the threshold current is k times the reference current.

14. The electrical system of claim 13, wherein the factor k is programmable.

15. The electrical system of claim 8, wherein the reference MOS transistor comprises a selected one of a plurality of redundant reference MOS transistors.

16. The electrical system of claim 8, wherein the over-current signal indicates whether the input current to the over-current protection sensor circuit is greater than a threshold current, and wherein in response to the input current being equal to the threshold current, a drain to source voltage of the reference MOS transistor is substantially equal to a drain to source voltage of the output MOS transistor.

17. A method of operating an over-current protection sensor circuit, the method comprising:

sourcing, by a reference current source, a reference current;

receiving, by a reference MOS transistor, the reference current and a gate voltage;

generating, by the reference MOS transistor, a reference drain voltage based on the reference current and the gate voltage;

receiving, by an operational amplifier, a reference voltage;

generating, by the operational amplifier, the gate voltage based on a difference between the reference voltage and the reference drain voltage;

receiving, by an output MOS transistor, an input current and the gate voltage, wherein an effective width of the output MOS transistor is a factor k times an effective width of the reference MOS transistor;

generating, by the output MOS transistor, an output drain voltage based on the input current and the gate voltage; and generating, by a comparator, an over-current signal based on a difference between the reference drain voltage and the output drain voltage.

18. The method of claim 17, wherein the over-current signal indicates whether the input current is greater than a threshold current.

19. The method of claim 18, wherein the threshold current is k times the reference current.

20. An overcurrent condition sense circuit, comprising:

a current source;

a reference transistor configured to:

conduct current of the current source, and generate a reference transistor voltage based on the conducted current, the reference transistor comprising a reference gate;

an output transistor having an effective width that is a factor k times an effective width of the reference transistor, the output transistor configured to:

receive an input current, the output transistor comprising an output gate electrically connected to the reference gate, and generate an output transistor voltage based on the input current, the output transistor voltage indicating an amount of the input current;

a difference amplifier circuit configured to generate an amplifier output signal based on a difference between the reference transistor voltage and the output transistor voltage; and a switching network configured to select the reference transistor from a plurality of candidate reference transistors.

21. The overcurrent condition sense circuit of claim 20, wherein the factor k is programmable.

22. The overcurrent condition sense circuit of claim 20, wherein the amplifier output signal indicates whether the input current is greater than a threshold current, and wherein the threshold current is k times a current conducted by the reference transistor.

* * * * *